June 28, 1949.　　　　B. CASTIGLIA　　　　2,474,616
TOE GAUGE
Filed July 25, 1947
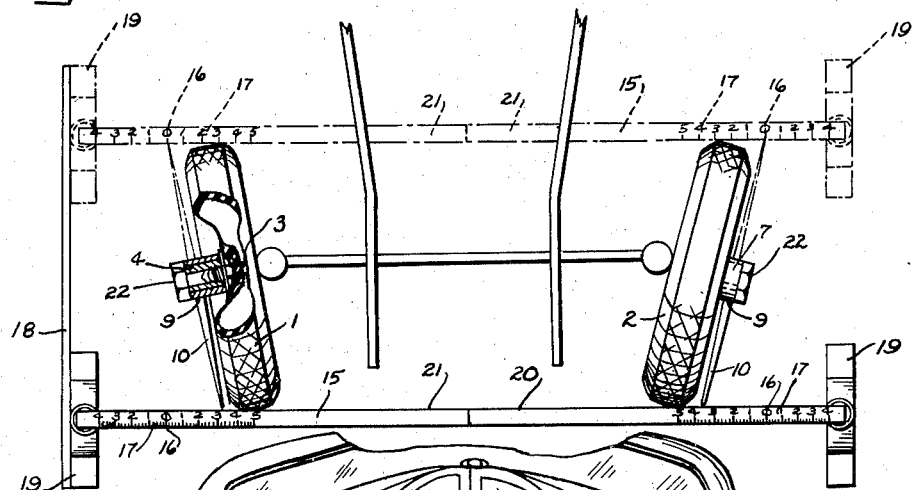
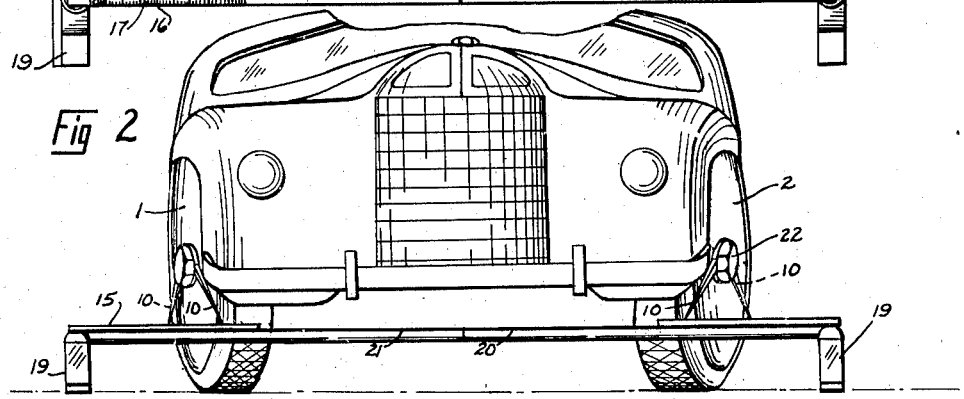
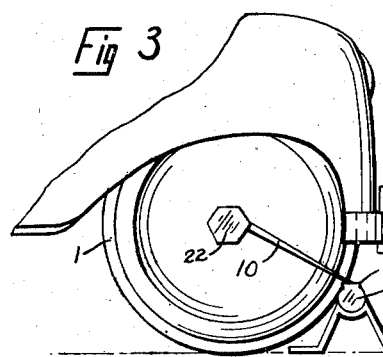
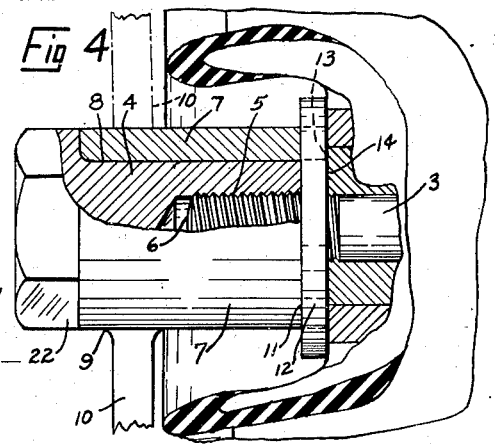
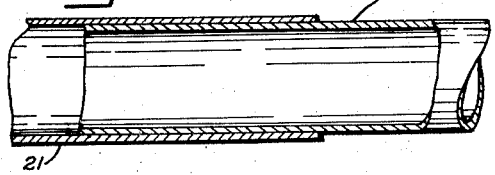
INVENTOR.
BIAGIS CASTIGLIA
BY Paul A. Talbot.
ATTORNEY Patented June 28, 1949

2,474,616

UNITED STATES PATENT OFFICE 2,474,616

TOE GAUGE

Blagis Castiglia, New York, N. Y., assignor to Wheel Aligning Necessities, Inc., New York, N. Y., a corporation of New York Application July 25, 1947, Serial No. 763,632

9 Claims. (Cl. 33—203.21)

My invention relates to a gauge for determining the toe, either in or out, of the wheels of motor cars and more particularly a gauge for measuring the angular mis-alignment of the front wheels of an automobile.

Among the purposes and objects are to provide a simple device which may be easily and quickly applied to measure the toe of automobiles of various makes and types.

Another object is to provide a device particularly suitable for service stations to quickly measure the degrees an automobile wheel is out of line as measured by the true or machined parts of the wheel rather than by the use of the tire as a means of determining the alignment.

Still another object is to provide an accurate pointer swingable on the true axis of the wheel.

An object is to provide an axle spindle extension on which a pointer swings and shows at a glance the degrees of mis-alignment of an automobile wheel.

An object is to provide a swinging pointer and scale bar which may be placed on any floor and aligned by the wheels without otherwise measuring the true center of the steering position.

An object is to provide a scale bar which is adapted to suit cars having different wheel suspension characteristics.

I accomplish these and other objects by the construction herein set forth and shown in the accompanying drawings which form a part of this, my disclosure.

In the drawings:

Fig. 1 is a top plan view of the front wheels shown with an exaggerated toe in.

Fig. 2 is a front elevation of an automobile showing the application of my toe gauge.

Fig. 3 is a right side elevation.

Fig. 4 is a sectional detail of the spindle extension and pointer bearing.

Fig. 5 is a fragmentary detail view of the scale bar.

Similar reference characters refer to similar parts throughout the several views of the drawings and in the specifications.

Devices intended to shoe the toe of the wheels of an automobile are either inaccurate or are difficult to apply due to the difficulty of determining the true straight ahead position the wheels would be in if neither of the two front wheels toed in or toed out. Measurements based on the accuracy of the tires, or a straight edge placed against the sides of the tires as a means of aligning the wheel on which the tire is mounted, are usually inaccurate because the sides of the tires are not accurate due to bulges and depressions and wobbling.

I overcome these difficulties by securing extension sleeves to the wheel hubs, which are true and on a plane perpendicular to the axes on which the wheels rotate. Pointers are swingingly mounted on the extensions and are swung from a zero setting on scales placed at the rear of the wheels to the same scales which are moved from the rear of the wheels to the front. The amount of toe, either in or out, may be determined by the position of the pointer at the front of each wheel, at one side or the other from zero.

In the specifications and drawings, I have not attempted to show all possible modifications which may be made but rather to disclose the construction of a preferred embodiment in detail so that one skilled in the art to which this invention pertains may more readily understand the construction. After a study of this disclosure modifications embodying the underlying principles, may suggest themselves.

In the specifications, the preciseness of the detailed description and in the drawings, the preciseness of the detailed construction, is not intended to limit the scope of my invention set forth in the appended claims.

Referring to the drawings, I have shown the front wheels 1 and 2 typical of most automobiles as toeing in; the amount being exaggerated so that the device, and its operation, may be more easily understood.

Replacing the axle spindle nut on each spindle 3, I have provided the extension sleeve 4 threaded at 5 to engage the threaded end 6 of the spindle. Each sleeve is provided on its exterior with the bearing 7, the bore 8 of which engages the bearing, which also serves as the hub 9 of the pointer 10 to permit the pointer to be freely rotated on the sleeve.

The end 11 of the sleeve is drawn snugly against the washer 12 or the end 13 of the hub 14 of the wheel to accurately align the sleeve with the wheel.

The scale bar 15 is temporarily placed on the floor and against the rear of both wheels and the pointers on each wheel are swung to contact, and the scale bar adjusted to read at zero degrees 16 on the calibrated scales 17, one being disposed on each end of the scale bar, each scale being calibrated in degrees at each side of the zero position to show the degrees the wheel, or each wheel, may toe in or out. The scale bar is moved from the rear of the wheels to their front and the pointer of each wheel swung to the front to again contact the scales to determine the toe reading.

A straight edge 18 may be used to align the scale bar when moved from the rear to the front. The bases 19 which support each end of the scale bar are made precisely 90 degrees or perpendicular to the axis of the scale bar so that the straight edge makes the accuracy of resetting of the scale bar certain.

To make it easy to set each pointer at zero, I have made the two ends of the scale bar to telescope.

The scale bar may be constructed of two pieces of hollow tubing; the tube at one end 20 having an external diameter suitable to fit the internal diameter of the tube at the opposite end 21 so that one tube may slide within the other thus to lengthen or shorten the scale bar and to permit the adjustment of the zero positions to suit the pointers.

The calibrated scale may be integral or flat scales secured to the exterior of the tubes or to the bases, one of which is secured to the end of each tube.

The size of the scale bar may also be reduced by telescoping the tubes as, for instance, when my device is not in use.

The sleeve is preferably provided with a hexagon head or other head 22 to facilitate screwing it onto the axle spindle.

The materials used, the size of the parts, and the details of construction may be changed or modified to suit my device to the particular car, truck, or other vehicle to which its use may be adapted; one size suiting a relatively large number of vehicles similar in size.

Having thus described a preferred embodiment of my invention, what I claim as new and desire to secure by these Letters Patent is set forth in the following claims:

1. In a toe gauge for vehicle wheels, pointers and means abutting the faced ends of the hubs of the wheels for rotatably mounting said pointers to swing in parallel relation to the faced ends of the hubs of said wheels, whereby said pointers may be swung on a plane perpendicular to the axes of rotation of said wheels and means registering with said pointers moveable to or from the front or rear of the wheels to show the toe of said wheels.

2. In a toe gauge for vehicle wheels, a scale bar and scales movable to or from the front or back of said wheels, pointers and means rotatably securing said pointers to abut the faced ends of the hubs of the wheels, whereby said pointers may be swung to register with said scales at the front or rear and to swing on a plane perpendicular to the axes of rotation of said wheels.

3. In a toe gauge for aligning axle spindle mounted wheels, having hub ends faced on a plane perpendicular to the axis of rotation of the wheels, pointers and means held in abutting relationship with said faced ends on said hubs to swingingly mount each of said pointers on a plane parallel to its hub end and a scale bar movable from or to the front or back of the wheels and scales thereon to register with said pointers to determine the toe of the wheels.

4. In a toe gauge for aligning axle spindle mounted wheels, having hub ends faced on a plane perpendicular to the axis of rotation of the wheels, pointers and means held in abutting relationship with said faced ends on said hubs to swingingly mount each of said pointers on a plane parallel to its hub end and a scale bar movable from or to the front or back of the wheels and scales thereon to register with said pointers to determine the toe of the wheels, and means for aligning the position of said scale bar with the wheels when moved from one position to the other.

5. In a toe gauge for aligning axle spindle mounted wheels, having hub ends faced on a plane perpendicular to the axis of rotation of the wheels, pointers and means held in abutting relationship with said faced ends on said hubs to swingingly mount each of said pointers on a plane parallel to its hub end and a scale bar movable from or to the front or back of the wheels and scales thereon to register with said pointers to determine the toe of the wheels, each of said scales being disposed near the ends of said scale bar and means for changing the distance between the scales on one end of said bar and the other end of the bar.

6. In a toe gauge for aligning axle spindle mounted wheels, having hub ends faced on a plane perpendicular to the axis of rotation of the wheels, pointers and means held in abutting relationship with said faced ends on said hubs to swingingly mount each of said pointers on a plane parallel to its hub end and a scale bar movable from or to the front or back of the wheels and scales thereon to register with said pointers to determine the toe of the wheels, each of said scales having zero indications and means for changing the relationship of one zero indication with the other.

7. In a toe gauge for aligning axle spindle mounted wheels, having hub ends faced on a plane perpendicular to the axis of rotation of the wheels, pointers and means held in abutting relationship with said faced ends on said hubs to swingingly mount each of said pointers on a plane parallel to its hub end and a scale bar movable from or to the front or back of the wheels and scales thereon to register with said pointers to determine the toe of the wheels, telescoping means for shortening or lengthening said scale bar and the distance between the scales on said scale bar.

8. In a toe gauge for aligning axle spindle mounted wheels, having hub ends faced on a plane perpendicular to the axis of rotation of the wheels, pointers and means held in abutting relationship with said faced ends on said hubs to swingingly mount each of said pointers on a plane parallel to its hub end and a scale bar movable from or to the front or back of the wheels and scales thereon to register with said pointers to determine the toe of the wheels, and a base supporting said scale bar above the floor, and means on said base for aligning said scale bar in one position with its other position at the front or back of the wheels.

9. A wheel aligning gauge, annular pointer members and pointers secured thereto and means abutting the faced end of the wheel hubs to rotatably mount said pointers to swing to and from the rear or front of the wheels about the axes of rotation of the wheels and scales movable to and from the front or rear of the wheels to cooperate with said pointers to determine the toe of the wheels.

BIAGIS CASTIGLIA.

REFERENCES CITED

The following references are of record in the file of this patent:

UNITED STATES PATENTS

| Number | Name | Date |
|---|---|---|
| 1,829,133 | Frykman | Oct. 27, 1931 |
| 1,922,344 | Bagge | Aug. 15, 1933 |
| 1,974,006 | Bennett | Sept. 18, 1934 |
| 2,005,870 | Miller et al. | June 25, 1935 |
| 2,079,070 | Johnston | May 4, 1937 |
| 2,108,743 | Brady | Feb. 15, 1938 |
| 2,176,357 | Palmer | Oct. 17, 1939 |